US012585423B2

(12) United States Patent
Fan et al.

(10) Patent No.: US 12,585,423 B2
(45) Date of Patent: Mar. 24, 2026

(54) AUDIO ARTIFACT REDUCTION IN UNIVERSAL AUDIO JACK (UAJ) INTERFACE CIRCUITS

(71) Applicant: CIRRUS LOGIC INTERNATIONAL SEMICONDUCTOR LTD., Edinburgh (GB)

(72) Inventors: Gaofeng Fan, Austin, TX (US); Qi Cai, Austin, TX (US); John B. Bowlerwell, Dunfermline (GB); Richard Turkson, Pflugerville, TX (US); Anindya Bhattacharya, Austin, TX (US); Bhoodev Kumar, Austin, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 256 days.

(21) Appl. No.: 18/500,224

(22) Filed: Nov. 2, 2023

(65) Prior Publication Data

US 2025/0147713 A1    May 8, 2025

(51) Int. Cl.
*G06F 3/16* (2006.01)

(52) U.S. Cl.
CPC .................................... *G06F 3/162* (2013.01)

(58) Field of Classification Search
CPC ......... G06F 3/162; G06F 13/385; H04R 3/00; H04R 19/016; H03F 1/301; H03K 17/165; H04B 1/44

(Continued)

(56) References Cited

U.S. PATENT DOCUMENTS 4,525,820 A    6/1985 Enoki et al.
5,995,633 A  *  11/1999 Cappels ................. H04B 1/207
381/74

(Continued)

FOREIGN PATENT DOCUMENTS

JP          4040013 B2     1/2008
WO      WO-2005117260 A1    12/2005

OTHER PUBLICATIONS

Texas Instrument CD4066B CMOS Quad Bilateral Switch Datasheet, Feb. 2020, Dallas, Texas (pp. 1-34 in pdf).

(Continued)

*Primary Examiner* — Duc Nguyen
*Assistant Examiner* — Chimezie Ezeriwe Bekee
(74) *Attorney, Agent, or Firm* — Andrew M. Harris; Mitch Harris, Atty at Law, LLC

(57) ABSTRACT

Circuit techniques reduce or prevent audible artifacts in a Universal Audio Jack (UAJ) interface circuit, improving handling of mis-configuration/mis-attachment of devices. The interface includes at least one terminal for accepting an audio input signal or providing an audio line output signal coupled to an input or output of a first audio circuit. The first audio circuit operates from a low voltage domain and receives the audio input signal or provides the audio line output signal. A second circuit operates from a higher voltage domain and a switching circuit couples the at least one terminal to the second circuit. The output is slew-rate controlled to control a transition time of the output, so that audible artifacts in the audio input signal or the audio line output signal that could be generated by the switching circuit connecting the second circuit to the at least one terminal are avoided.

20 Claims, 6 Drawing Sheets

(58) Field of Classification Search
USPC ............................................ 381/123; 700/94
See application file for complete search history.

(56) References Cited

U.S. PATENT DOCUMENTS

| | | | |
|---|---|---|---|
| 6,859,074 | B2 | 2/2005 | Ajit |
| 7,241,179 | B2 | 7/2007 | Chennakeshu |
| 7,760,007 | B2 | 7/2010 | Holzmann |
| 8,254,598 | B2 | 8/2012 | Holzmann |
| 9,614,517 | B2 | 4/2017 | Krishna |
| 2002/0109525 | A1* | 8/2002 | Shin ................. H03K 19/00384 |
| | | | 326/26 |
| 2009/0110213 | A1* | 4/2009 | Holzmann ........... H04R 19/016 |
| | | | 381/95 |
| 2014/0098297 | A1* | 4/2014 | Stultz ...................... H03K 17/30 |
| | | | 348/705 |
| 2016/0249127 | A1* | 8/2016 | Kim ................. G10K 11/17881 |
| 2017/0012618 | A1* | 1/2017 | Krishna ............... H03K 17/166 |

OTHER PUBLICATIONS

Texas Instrument application report SLVA948, "Achieve Bidirectional Control and Protection Through Back-to-Back Connected eFuse Devices", Dec. 2017, Dallas, Texas (pp. 1-10 in pdf).

M. Jankowski, "High-voltage current-controlled analog switches for various kinds of application," 2011 11th International Conference the Experience of Designing and Application of CAD Systems in Microelectronics (CADSM), Feb. 2011, pp. 42-45, Ukraine. (pp. 1-4 in pdf).

J. Steensgaard, "Bootstrapped low-voltage analog switches," 1999 IEEE International Symposium on Circuits and Systems (ISCAS), 1999, pp. 29-32, vol. 2 (pp. 1-4 in pdf).

J. D. Plummer and J. D. Meindl, "A monolithic 200-V CMOS analog switch," in IEEE Journal of Solid-State Circuits, vol. 11, No., 6, 809-817, Feb. 1976, (pp. 1-2 in pdf).

Adisak Monpapassorn, "An analogue switch using a current conveyor", International Journal of Electronics, vol. 89, No. 8, pp. 651-656, Bankok, Thailand, Oct. 2002, (pp. 1-7 in pdf).

H. W. Ruegg, "An integrated FET analog switch," in Proceedings of the IEEE, vol. 52, No. 12, pp. 1572-1575, Dec. 1964, Piscataway, NJ (pp. 1-5 in pdf).

C. J. B. Fayomi and G. W. Roberts, "Design and characterization of low-voltage analog switch without the need for clock boosting," The 2004 47th Midwest Symposium on Circuits and Systems, MWSCAS '04, Jul. 2004, pp. III-315 to III-318, Hiroshima, Japan, (pp. 1-4 in pdf).

W. Shan et al., "TG-SPP: A One-Transmission-Gate Short-Path Padding for Wide-Voltage-Range Resilient Circuits in 28-nm CMOS," in IEEE Journal of Solid-State Circuits, vol. 55, No. 5, pp. 1422-1436, May 2020, Piscataway, NJ (pp. 1-15 in pdf).

Weize Xu and E. G. Friedman, "Clock feedthrough in CMOS analog transmission gate switches," 15th Annual IEEE International ASIC/ SOC Conference, pp. 181-185, Sep. 2002, Rochester, NY, (pp. 1-5 in pdf).

M. Baus, et. al, "Monolithic bidirectional switch (MBS)—a novel MOS-based power device," Proceedings of 35th European Solid-State Device Research Conference (ESSDERC), pp. 473-476, Sep. 2005, Grenoble, France (pp. 1-5 in pdf).

F. Heinke and R. Sittig, "The monolithic bidirectional switch (MBS)", 12th International Symposium on Power Semiconductor Devices & ICs. Proceedings, pp. 237-240, May 2000, Toulouse, France (pp. 1-4 in pdf).

G. P. Singh and R. B. Salem, "High-voltage-tolerant I/O buffers with low-voltage CMOS process," in IEEE Journal of Solid-State Circuits *JSSC), vol. 34, No. 11, pp. 1512-1525, Nov. 1999, Piscataway, NJ (pp. 1-14 in pdf).

International Search Report in PCT/US2024/052713 mailed on Dec. 26, 20204. (pp. 1-10 in pdf).

* cited by examiner

AUDIO ARTIFACT REDUCTION IN UNIVERSAL AUDIO JACK (UAJ) INTERFACE CIRCUITS

BACKGROUND

1. Field of Disclosure

The field of representative embodiments of this disclosure relates to handling of audio signals in connections to a Universal Audio Jack (UAJ), and in particular to techniques for reducing audible artifacts generated when the UAJ configuration on the interface side does not match a connected device.

2. Background

Personal computer systems, including laptop computers, and personal devices, such as tablets and smart phones, typically include an audio interface that has both input and output capabilities. In desktop computers, there has typically been sufficient external panel space and available internal volume to accommodate multiple audio input and output connectors. In the smaller devices, such as laptops, tablets and smartphones, input and output functions have been consolidated into one connector, which generally has multiple functional modes. For example, the Universal Audio Jack (UAJ) present in many laptop computers, may be used as a stereo line-level output jack, a stereo line input jack, or a headset jack for headsets having a microphone and earspeakers. The headset configuration/mode typically has a common terminal, a pair of high-level audio output signals for the earspeakers, and a microphone input terminal that also carries a direct-current (DC) voltage used to supply operating voltage to a condenser microphone element.

Internal management of the various signals supplied to/received from the UAJ is typically performed by device configuration software/firmware that performs detection to ascertain whether a device is connected, and if so, what type of device is connected. Manual configuration may also be performed and may be an override of automatic configuration. In any case, either during configuration, or during changes made by a user, audible artifacts such as pops and clicks may be generated on the UAJ terminal signals, by connection of audio interface circuit paths that cause voltages to be impressed on terminals that may be connected to output devices, for example home audio system speakers, or professional sound generating equipment, and the impressed voltages, which are generally transient, may generate pops/clicks and other audible artifacts. Such events produce undesirable sound and may in some cases, damage audio output equipment such as the output transducers, e.g., loudspeakers.

Therefore, it would be advantageous to provide an audio interface circuit and its method of operation that reduce or avoid generation of pops/clicks and other audible artifacts.

SUMMARY

Reduction or avoidance of generation of pops/clicks and other audible artifacts is accomplished in audio interface circuits and their method of operation.

The audio interface circuits include at least one terminal for accepting an audio input signal or providing an audio line output signal and a first audio circuit having an input or an output coupled to the at least one terminal. The first audio circuit is operated from a low voltage domain and receives the audio input signal as an input or provides the audio line output signal as an output. The audio interface circuits also include a second circuit operated from a high voltage domain having a voltage level greater than a voltage level of the low voltage domain, and a switching circuit that couples the at least one terminal to an output of the second circuit in response to a control signal. The second circuit has an output that is slew-rate controlled to control a transition time of the output of the second circuit in response to the control signal, so that audible artifacts in the audio input signal or the audio line output signal that could be generated by the switching circuit connecting the second circuit to the at least one terminal are avoided.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION OF ILLUSTRATIVE EMBODIMENT

The present disclosure encompasses circuits, integrated circuits and their methods of operation, that prevent or reduce generation of audible artifacts by an audio interface circuit, particular, the audio interface circuit may supply signals to and receive signals from a universal audio jack (UAJ) that is capable of receiving connection of various external audio transducers or other audio devices, such as headsets with or without a microphone, stereo microphones, and line input/output signals. The audio interface circuit includes at least one terminal for accepting an audio input signal or providing an audio line output signal and a first audio circuit having an input or an output coupled to the at least one terminal. The first audio circuit may be operated from a low voltage domain and receive the audio input signal as an input or may provide the audio line output signal as an output. The audio interface circuit may also include a second circuit operated from a high voltage domain having a voltage level greater than a voltage level of the low voltage domain, and a switching circuit that couples the at least one terminal to an output of the second circuit in response to a control signal. The second circuit, may be, for example, a microphone bias circuit that provides operating voltage to an external microphone connected to the at least one terminal. The output of the second circuit is slew-rate controlled to control a transition time of the output of the second circuit in response to the control signal, so that audible artifacts in the audio input signal or the audio line output signal that could be generated by the switching circuit connecting the second circuit to the at least one terminal are avoided.

Figure 1A:
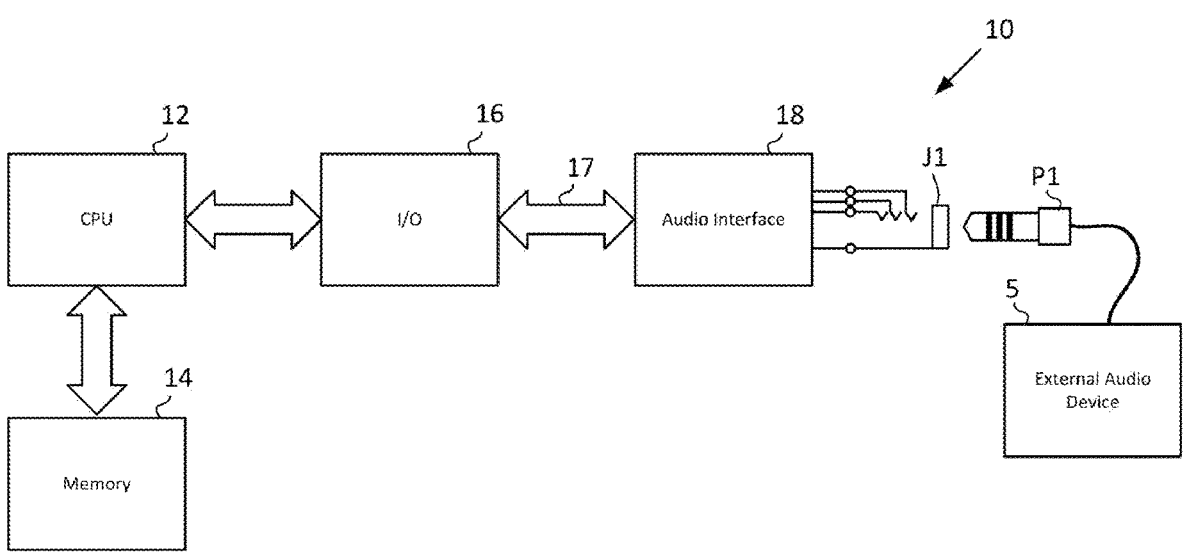
FIG. 1A is a block diagram of an example system 10, in accordance with an embodiment of the disclosure.

Referring now to FIG. 1A, a block diagram of an example system 10 is shown, in accordance with an embodiment of the disclosure. Example system 10 is an example of a computer system, which may be, e.g., a laptop computer having a single UAJ for connection to audio devices, although it is understood that the techniques disclosed herein are applicable to other types of computing devices, such as desktop computers, and to personal devices, such as smartphones, audio/video players/recorders, and tablets having audio connections. A central processing unit (CPU) 12 is coupled to a memory 14 that stores program instructions and data forming an operating system, application software, and other software modules supporting execution of the operating system and application software. An input/output (I/O) subsystem 16 connects peripheral devices to CPU 12 via one or more interface buses 17, and in example system 10, one of the peripheral devices is an audio interface 18 that is connected to a UAJ J1. An external audio device 5 connects to UAJ J1 via a plug 5 that may have, in the example, two to four conductors.

Figure 1B:
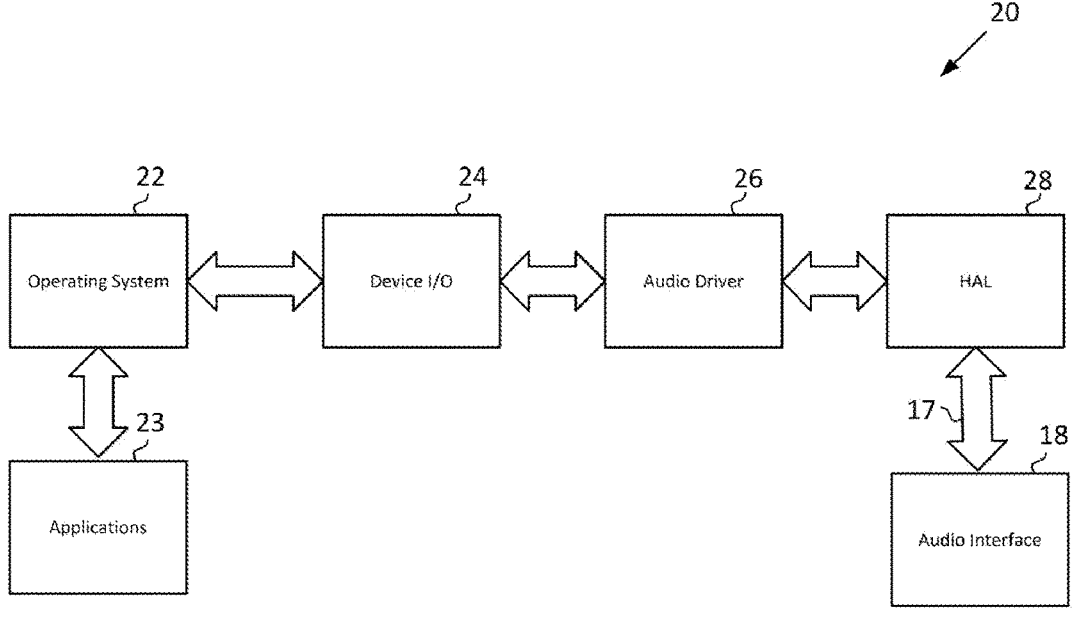
FIG. 1B is a block diagram depicting an example architecture 20 of software and hardware components in system 10, in accordance with an embodiment of the disclosure.

Referring now to FIG. 1B, a block diagram depicting an example architecture 20 of software and hardware components in system 10 is shown, in accordance with an embodiment of the disclosure. An operating system 22 provides resources to applications 23 executing within system 10. Operating system 22 also manages a device input/output layer 24 that provides communications with various drivers provided for management of hardware devices. One of the drivers in example architecture 20 is an audio device driver 26 that, through an operating-system provided hardware abstraction layer (HAL) 28 communicates with audio interface 18 over interface bus 17. The interactions between audio interface 18, UAJ J1, and external audio devices, e.g., external audio device 5 of FIG. 1A is generally managed by audio device driver 26, which may include determinations of a device type of external audio device 5, configuration of connections to external audio device 5, and receipt of commands from operating system 22 and/or applications 23, which may directly control the configuration of UAJ J1. During the automatic device detection and configuration process, during device driver initialization, or due to direct configuration commands received from operating system 22 or applications 23, the connection signal types may be changed, and in some cases and stages of operation, the signaling configuration of UAJ J1 may not properly match the signal configurations of an external audio device 5 connected to UAJ J1. In particular, transitions between providing a microphone bias voltage for operation of a condenser microphone element connected to terminals of UAJ J1 and providing or receiving other types of signals, will generate a pop or other audible artifact in the external audio device. For example, if UAJ J1 is connected to an audio amplifier operating loudspeakers via expected audio line output signals provided to UAJ J1, but the microphone bias signal is instead sent, even temporarily during automatic configuration, to those same terminals, transients will be provided to the connected audio amplifier and reproduced by the loudspeakers, which may cause damage or high-volume undesirable pops. In other examples, UAJ J1 may be configured to provide headphone transducer or speaker output signals, but UAJ J1 may alternatively be configured to accept audio input signals, in which case transients may also occur. While example system 10 of FIG. 1A and hardware/software architecture 20 of FIG. 1B provide examples relating to a typical laptop or desktop computer system, such examples are not limiting, and the techniques of the present disclosure may be used in systems as simple as a single-threaded dedicated microcontroller system, without loss of generality, or in other architectures or phases of system operation in which management of audio interface 18 may be performed directly by firmware or other software or hardware elements.

Figure 2:
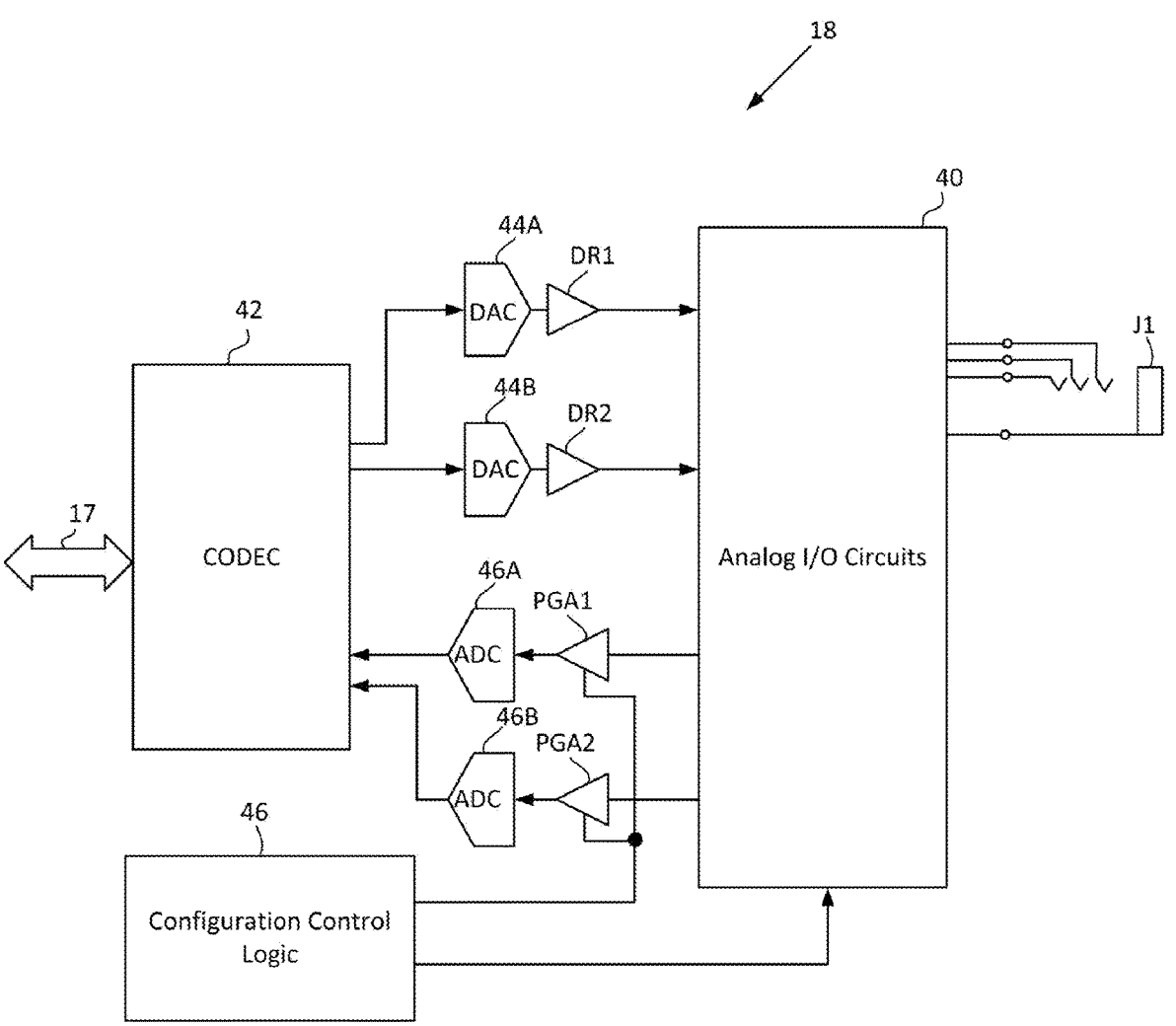
FIG. 2 is a block diagram illustrating example details of audio interface 18 in FIG. 1A and FIG. 1B, in accordance with an embodiment of the disclosure.

Referring now to FIG. 2, a block diagram illustrating example details of audio interface 18 in FIG. 1A and FIG. 1B is shown, in accordance with an embodiment of the disclosure. An encoder/decoder (CODEC) 42 receives digital audio information from, and provides digital audio information to, interface bus 17. Audio output information is directed to digital-to-analog converters (DACs) 44A, 44B, and digital audio information is received from analog-to-digital converters (ADCs) 46A, 46B. A pair of line drivers DR1, DR2 provide line-level (e.g., 1 Vp-p) output signals and/or transducer output signals, to analog I/O circuits 40, which include switching and microphone preamplification/biasing for microphones in external connected devices. Analog I/O circuits, details of which will be described in further detail below, are used to manage the configuration of signals on UAJ J1 that are provided to and/or received from external audio devices. Example audio interface 18 also receives line level inputs that are provided to programmable gain amplifiers (PGAs) PGA1, PGA2, to handle a wide range of audio input voltages. A configuration control logic block 46 provides control information to PGAs PGA1, PGA2 and to analog I/O circuits 40 to manage the configuration of audio interface 18.

Figure 3:
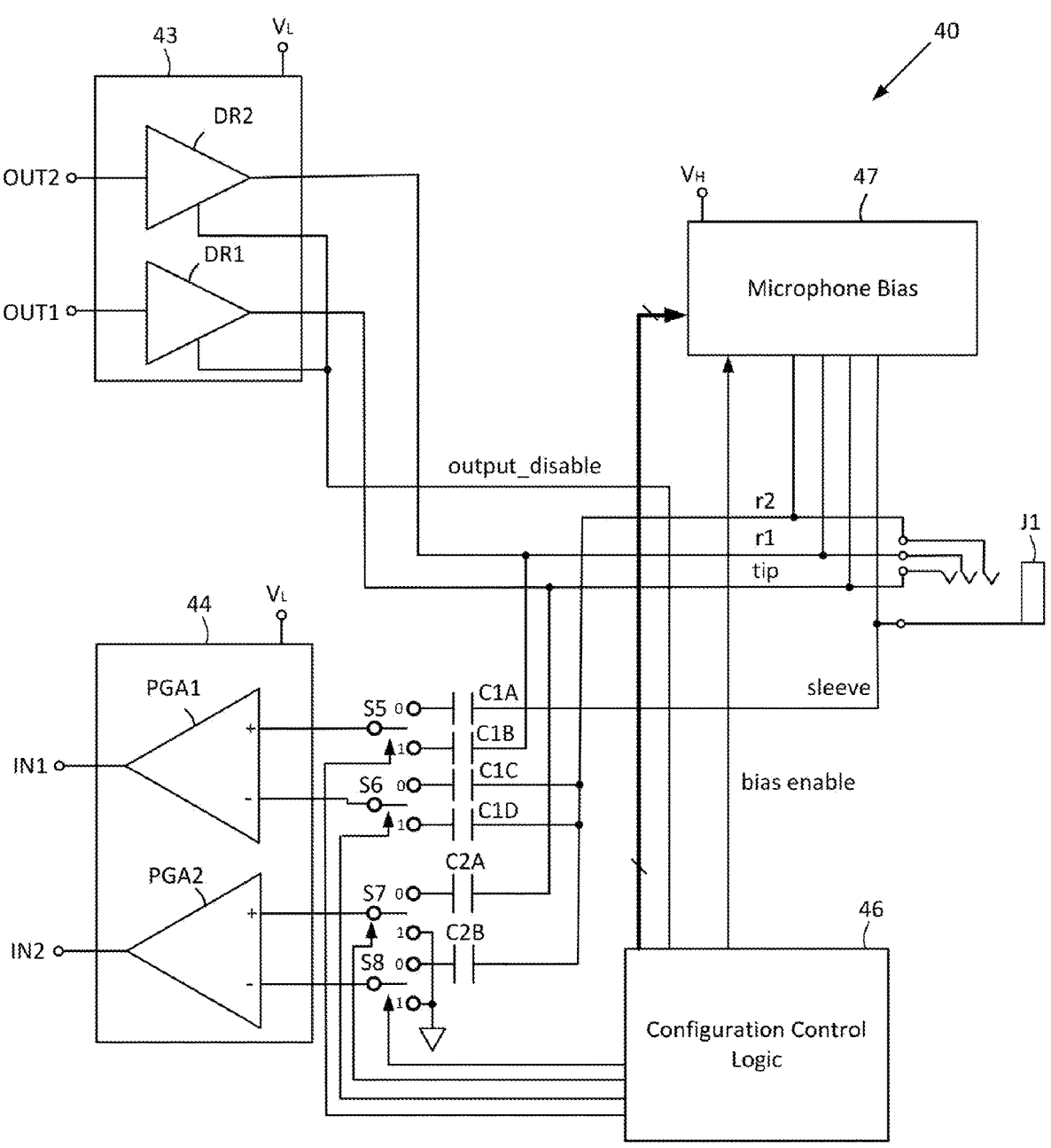
FIG. 3 is a simplified schematic diagram illustrating an example audio interface circuit 40, as may be implemented in audio interface 18 of FIG. 1A, FIG. 1B and FIG. 2, in accordance with an embodiment of the disclosure.

Referring now to FIG. 3, a simplified schematic diagram illustrating an example audio interface circuit 40, as may be implemented in audio interface 18 of FIG. 1A, FIG. 1B and FIG. 2 is shown, in accordance with an embodiment of the disclosure. An audio output block 43 includes line drivers DR1, DR2 that receive audio output signals OUT1, OUT2 and an audio input block 44 includes PGAs PGA1, PGA2 that provide audio input signals IN1, IN2 as described above. Audio input block 44 is AC coupled to terminals of UAJ J1 by capacitors C1A-C1D and C2A-C2B, which provide signals to PGAs PGA1, PGA2, respectively, depending on a state of switches S5-S8. Terminals of UAJ J1 are coupled by capacitors C1A-C1D and C2A-C2B to switches S5-S8 to configure inputs to audio interface circuit 40 according to control signals received from configuration control logic block 46 as illustrated in Table I below. Audio outputs from audio interface circuit 40 are enabled or disabled according to a control signal output_disable, also provided by configuration control logic block 46. Sleeve terminal sleeve, a first ring terminal r1, a second ring terminal r2, and a tip terminal tip, of UAJ J1 are coupled by capacitors C1A-C1D and C2A-C2B to audio input block 44, as described above. A microphone bias circuit 47 is enabled by a microphone bias enable control signal bias enable, and provides a microphone bias voltage generated from higher-voltage domain $V_H$ that is selectively applied to a selected one of terminals, Tip, r1, r2, or Sleeve, of UAJ J1, according to a configuration selected according to Table I below, where "X" indicates a "don't care" state that may assume either a "0" or a "1" value without affecting the configuration or operation of the system.

TABLE I

| Device Type | Sleeve | Ring terminal r2 | Ring terminal r1 | Tip | s1 | s2 | s3 | s4 | s5 | s6 | s7 | s8 | bias enable |
|---|---|---|---|---|---|---|---|---|---|---|---|---|---|
| Headset 1 | Ground | MIC1* | OUT1 | OUT2 | 0 | 0 | Off | Off | 0 | 0 | X | X | 1 |
| Headset 2 | MIC1 | Ground | OUT1 | OUT2 | 1 | 1 | Off | Off | 0 | 0 | X | X | 1 |
| Line Output | Ground | Ground | OUT1 | OUT2 | 0 | 1 | Off | Off | X | X | X | X | 0 |
| Line Input | Ground | Ground | IN1 | IN2 | 0 | 1 | Off | Off | 1 | 1 | 0 | 0 | 0 |
| Stereo Mic | Ground | Ground | MIC1 | MIC2 | 0 | 1 | On | On | 1 | 1 | 0 | 0 | 1 |

Device type Headset 1 and Headset 2 are two different types of headsets wired with the return (GND) and microphone terminals interchanged. For the headset type Headset 1, the polarity of the ADC receiving input from PGA1 is inverted internally for the configuration. The changing of switch control signals s1-s8 and microphone bias enable control signal bias enable is managed by the various software modules as described above and may lead to pops or other artifacts, depending on the connected device type. Microphone bias circuit 47 is designed to reduce or avoid the pops or other artifacts caused by application of microphone bias to any of terminals tip, r1, r2 and sleeve selectable/deselectable in Table I, since each of terminals tip, r1, r2 and sleeve may carry microphone signals and the microphone bias voltage present when a microphone input is selected and microphone bias circuit 47 is enabled.

Figure 4A:
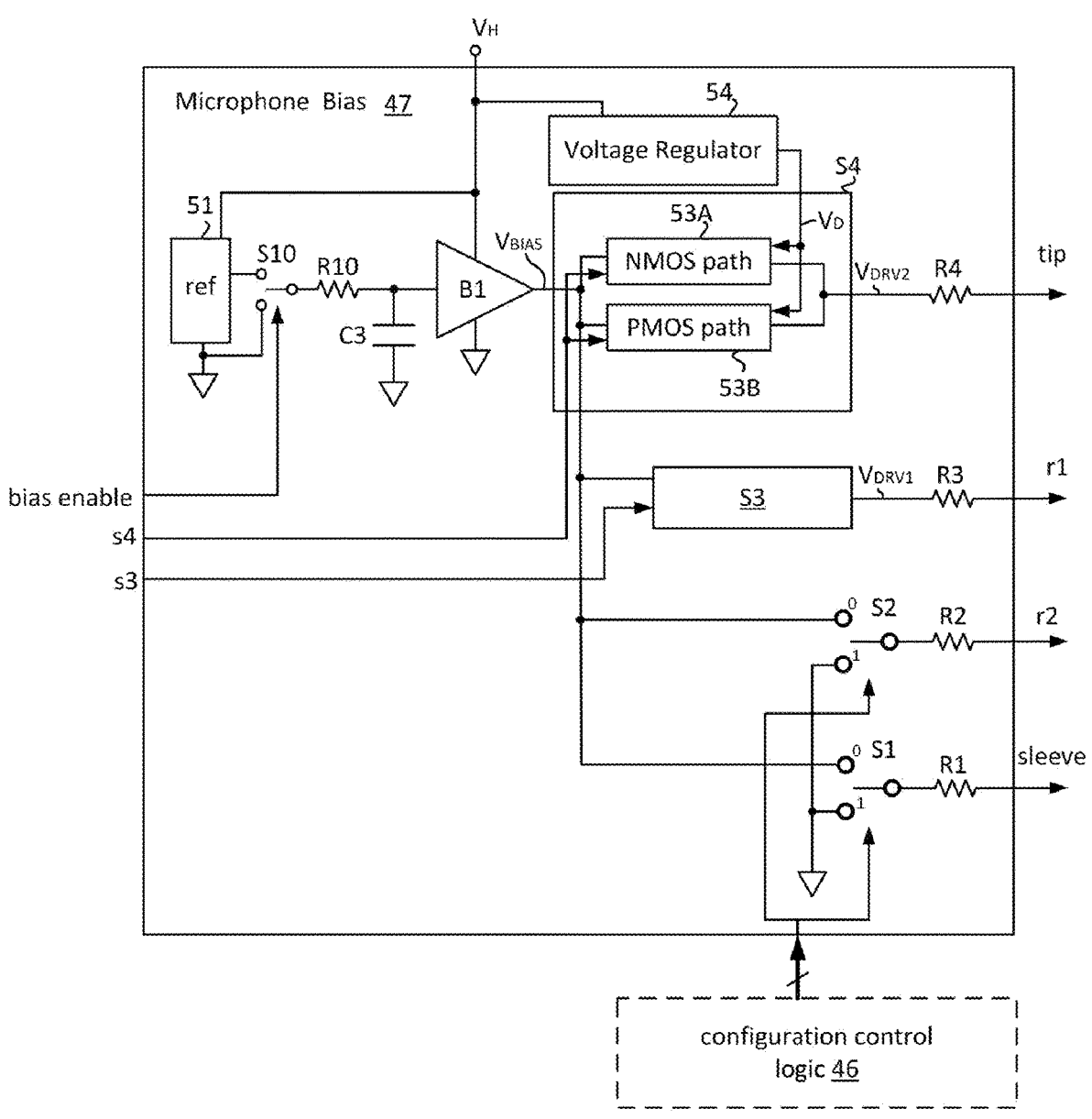
FIG. 4A is a block diagram illustrating an example microphone bias circuit 47 that may be used to implement microphone bias circuit 47 of FIG. 3, in accordance with an embodiment of the disclosure.

Referring now to FIG. 4A, a block diagram illustrating an example microphone bias circuit 47 that may be used to implement microphone bias circuit 47 of FIG. 3 is shown, in accordance with an embodiment of the disclosure. A voltage reference circuit 51 is selectably coupled by a switch S10 to a filter formed by a resistor R10 and a capacitor C3 that control the slew rate (rise time) of a voltage provided at the input to a buffer amplifier B1, which provides a slew rate of a microphone bias voltage VBIAS that is independent of load. The output of microphone bias circuit 47 is provided through one of switches S1, S2, S3 or S4, through one of corresponding resistors R1, R2, R3 or R4, depending on the selected configuration as shown in Table I above. Switches S3 and S4 are of special construction to prevent generation of audible artifacts such as pops/clicks that might otherwise be presented, for example, to an audio amplification system having inputs connected to terminals Tip and r1 of UAJ J1, when the configuration for a stereo microphone is selected. An example implementation of switches S3 and S4 is described below with reference to FIG. 5, and provides isolation and protection from the microphone bias signal VBIAS generated from higher voltage domain $V_H$ by preventing current flow from microphone bias circuit 47 through terminals Tip and r1 of UAJ J1 when switches S3 and S4 are OFF, i.e., microphone bias voltage VBIAS is isolated from a microphone bias output voltage $V_{DRV1}$ at the output of switch S3 and a microphone bias output voltage $V_{DRV2}$ at the output of switch S4. Switches S3 and S4 may be of identical construction and may have an N-channel metal-oxide semiconductor (NMOS) signal path 53A and a P-channel metal-oxide semiconductor (PMOS) signal path 53B, which avoids slew rate problems associated with using a single transistor to enable the microphone bias voltage, and that would cause a high slew rate in the microphone bias output voltages $V_{DRV1}$ of $V_{DRV2}$ due to the action of the switch itself. Also, NMOS signal path 53A and PMOS signal path 53B are designed to prevent leakage of microphone bias circuit output voltage VBIAS when NMOS signal path 53A and PMOS signal path 53B are in the off state, since voltage reference 51 and buffer amplifier B1 are operated from a higher-voltage domain $V_H$, while other circuits in audio interface circuit 40 are operated from a lower voltage domain $V_L$. A voltage regulator 54 provides a bias voltage VD used in the operation and structure of NMOS signal path 53A and a PMOS signal path 53B as described below with reference to FIG. 5.

Figure 4B:
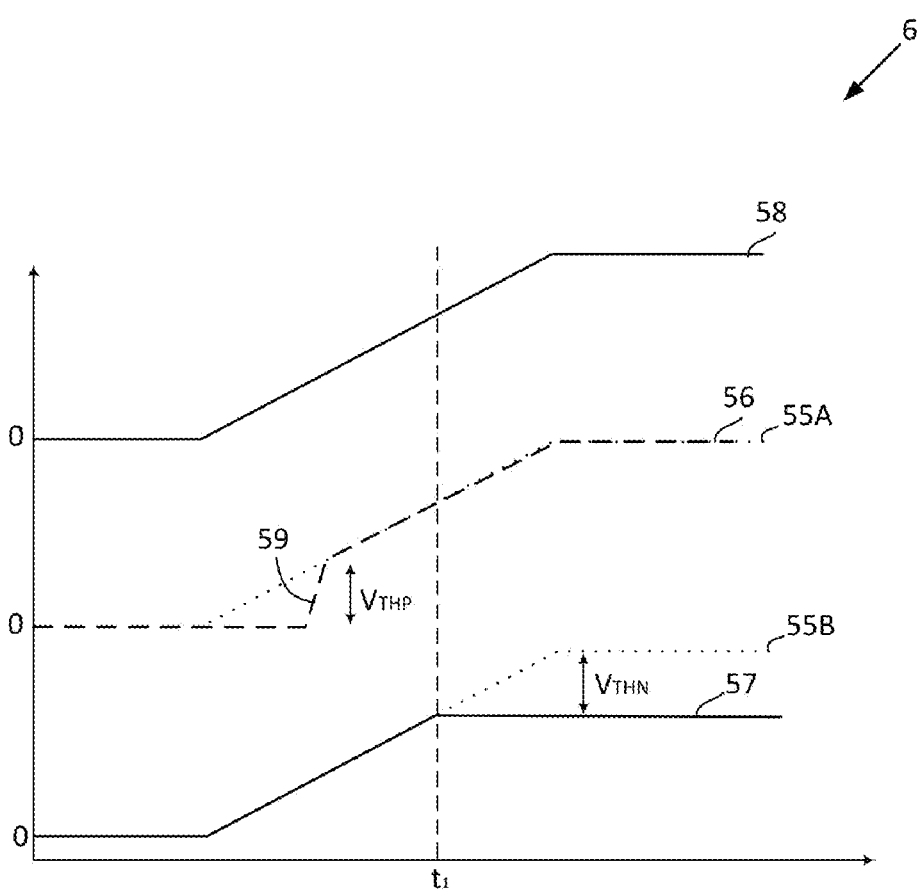
FIG. 4B is a signal waveform diagram 60 illustrating example signals within microphone bias circuit 47 of FIG. 4A, in accordance with an embodiment of the disclosure.

Referring now to FIG. 4B, a signal waveform diagram 60 illustrating example signals within microphone bias circuit 47 of FIG. 4A is shown, in accordance with an embodiment of the disclosure. Waveform 58 illustrates the overall output waveform of microphone bias output voltage $V_{DRV1}$, $V_{DRV2}$, while waveform 56 illustrates what the overall output waveform would be with NMOS signal path 53A disabled and waveform 57 illustrates what the overall output waveform would be with PMOS signal path 53B disabled. Due to the turn-on threshold in PMOS signal path 53B, a sudden rise 59 in waveform 56 occurs when an input signal 55A with a constant slew rate is provided to the input of PMOS signal path 53B. In PMOS signal path 53B, the rise of the waveform commences immediately, but stops rising at time $t_1$ due to the threshold voltage drop $V_{THN}$ present across the switching device in the on-state. Waveform 55B shows the input voltage waveform and is identical with waveform 55A. The N-channel output waveform 57, P-channel output waveform 56, and total output waveform 58 have been offset in the graph of FIG. 4B for readability.

Figure 5:
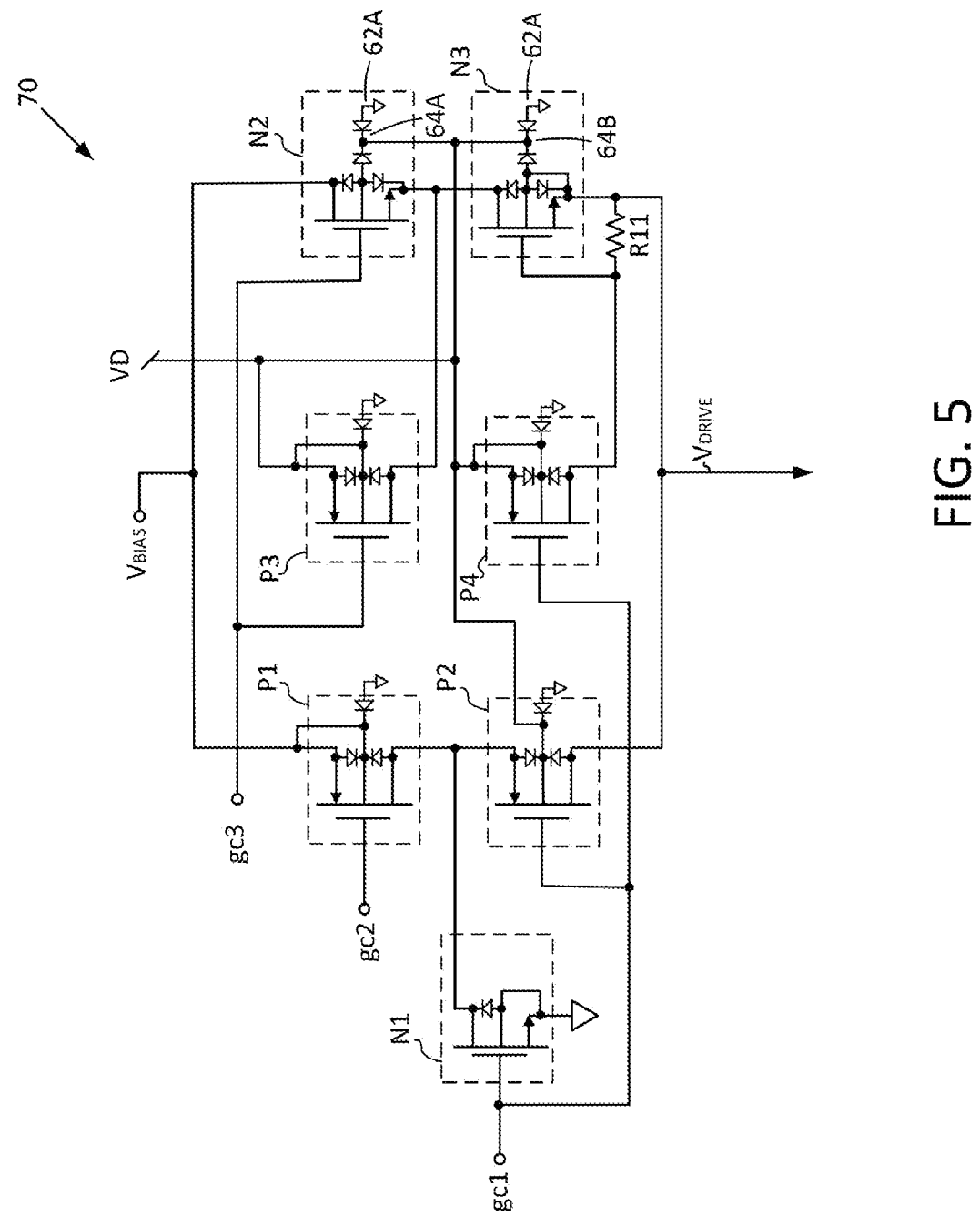
FIG. 5 is a schematic diagram illustrating an example switching circuit 70 that may be used to implement switches S3 and S4 in microphone bias circuit 47 of FIG. 4A, in accordance with an embodiment of the disclosure.

Referring now to FIG. 5, a schematic diagram illustrating an example switching circuit 70 that may be used in microphone bias circuit 47 of FIG. 4A is shown, in accordance with an embodiment of the disclosure. Example switching circuit 70 is an implementation of switches S3 and S4 of FIG. 4. A pair of transistors P1, P2 provide PMOS path 53B and conduct current from microphone bias circuit 47 microphone bias VBIAS to provide microphone bias voltage output voltage $V_{DRIVE}$ (e.g., $V_{DRV1}$, $V_{DRV2}$) to terminals connected to an external microphone through resistors R1, R2, as described above. A transistor N1 is provided to clamp the intermediate node connecting the drain of transistor P1 and the source of transistor P2. Gate control voltages gc1 and gc2 are provided to control transistors P1, P2 and N1, and while gate control signal gc2 toggles between 0V (on-state) and higher-voltage domain VBIAS (off-state) to ensure that transistor P1 is turned fully off when switching circuit 70 is "open", gate control signal gc1 toggles between 0V (on-state) and a switch protection bias voltage VD greater than or equal to lower-voltage domain power supply voltage $V_L$. Transistor P2 has its N-well connected to protection bias voltage VD, which provides protection against any overvoltage at lower voltage domain voltage $V_L$ that may be transiently present when transistor P1 is turned off when switching circuit 70 turns off. Transistors N2, N3 provide NMOS path 53A. A gate control signal gc3 toggles between protection bias voltage VD (on-state) and 0V (off-state). Gate control signal gc3 also controls a transistor P3, which clamps the intermediate node between transistors N2 and N3 to protection bias voltage VD when transistors N2 and N3, are turned off preventing any transient through transistor N2 from pulling the intermediate node to a voltage higher than protection bias voltage VD, i.e., toward higher-voltage domain power supply voltage $V_H$, from which transistor N2 conducts current in the on-state. A transistor P4 is operated by gate control signal gc1, described above, to pull the voltage at the gate of transistor N3 up toward protection bias voltage VD. A resistor R11 is provided to prevent transistor N3 from turning on. Transistor N2 and transistor N3 have their deep N-wells 64A, 64B connected to protection bias voltage VD and the surrounding substrate 62A, 62B is at ground potential, so that the parasitic N-well to substrate diodes of transistors N2, N3 remain reverse-biased. Example voltages for the bias and power supply voltage in example switching circuit 70 might be: higher-voltage domain power supply voltage $V_H$=5.5V and protection bias voltage VD=3.0V, microphone bias output voltage $V_{DRIVE}$ ranges from 0V to 3.3V, and where lower-voltage domain power supply voltage $V_L$, may be, for example, in the range between 1V and 2V. Signals in the lower-voltage domain can thereby vary in a range from −1.4V to +1.4V without causing mis-operation.

In summary, this disclosure shows and describes circuits and methods for preventing generation of audible artifacts by an audio interface circuit. The audio interface circuit may include at least one terminal for accepting an audio input signal or providing an audio line output signal and a first audio circuit having an input or an output coupled to the at least one terminal. The first audio circuit may be operated from a low voltage domain and receive the audio input signal as an input or may provide the audio line output signal as an output. The audio interface circuit may also include a second circuit operated from a high voltage domain having a voltage level greater than a voltage level of the low voltage domain, and a switching circuit that couples the at least one terminal to an output of the second circuit in response to a control signal. The second circuit may have an output that is slew-rate controlled to control a transition time of the output of the second circuit in response to the control signal, so that audible artifacts in the audio input signal or the audio line output signal that could be generated by the switching circuit connecting the second circuit to the at least one terminal are avoided.

In some example embodiments, the at least one terminal has a function selectable between at least one of an audio line input or audio output function for providing an audio line output signal or accepting an audio input signal, and between a microphone bias output function. The first audio circuit may be an audio input or line output circuit coupled to the at least one terminal for receiving the audio input signal or supplying the audio line output audio signal. The second circuit may be a microphone bias driver having an output that provides the microphone bias output level coupled to the at least one terminal. The function of the at least one terminal may be selectable between all of the audio line output function, the microphone bias output function, and the audio input function. The switching circuit may use a switch protection bias voltage greater than or equal to a power supply voltage of the low voltage domain to protect switches of the switching circuit when the microphone bias driver is not coupled to the at least one terminal. The at least one terminal may implement terminals of a universal audio jack (UAJ), and the slew rate of the output of the microphone bias driver may be independent of a load presented to the output of the microphone bias driver. The microphone bias driver may include an output driver for producing the output of the microphone bias driver, and a slew rate control circuit for receiving a reference input and providing a slew-rate-controlled output signal to an input of the output driver.

In some example embodiments, the switching circuit may use a switch protection bias voltage greater than or equal to a power supply voltage of the low voltage domain to protect switches of the switching circuit. In some example embodiments, an audio output driver of the first audio circuit that provides the audio line output signal may be designed to tolerate the voltage level of the high voltage domain. In some example embodiments, the switching circuit may be designed to track the slew rate of the output of the second circuit.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to another type of audio interface circuit.

What is claimed is:

1. An audio interface circuit, comprising:
   at least one terminal for accepting an audio input signal or providing an audio line output signal;
   a first audio circuit having an input or an output coupled to the at least one terminal, wherein the first audio circuit is operated from a low voltage domain and receives the audio input signal as an input or provides the audio line output signal as an output;
   a second circuit operated from a high voltage domain having a first voltage level greater than a second voltage level of the low voltage domain, wherein the second circuit has a load-independent direct-current (DC) output that is generated in response to a control signal and is slew-rate controlled to control a transition time of the output of the second circuit in response to the control signal; and
   a switching circuit that controls application of a voltage from the output of the second circuit to the at least one terminal in response to the control signal, so that audible artifacts in the audio input signal or the audio line output signal that could be generated by the switching circuit connecting the second circuit to the at least one terminal are avoided.

2. The audio interface circuit, of claim 1, wherein the at least one terminal has a function selectable between at least one of an audio line input or audio output function for providing an audio line output signal or accepting an audio input signal, and between a microphone bias output function, wherein the first audio circuit is an audio input or line output circuit coupled to the at least one terminal for receiving the audio input signal or supplying the audio line output audio signal, wherein the second circuit is a microphone bias driver having an output that provides the microphone bias output level coupled to the at least one terminal.

3. The audio interface circuit of claim 2, wherein the function of the at least one terminal is selectable between all of the audio line output function, the microphone bias output function, and the audio input function.

4. The audio interface circuit of claim 2, wherein the switching circuit uses a switch protection bias voltage greater than or equal to a power supply voltage of the low voltage domain to protect switches of the switching circuit when the microphone bias driver is not coupled to the at least one terminal.

5. The audio interface circuit of claim 2, wherein the at least one terminal implements terminals of a universal audio jack (UAJ).

6. The audio interface circuit of claim 2, wherein the slew rate of the output of the microphone bias driver is independent of a load presented to the output of the microphone bias driver.

7. The audio interface circuit of claim 6, wherein the microphone bias driver comprises:
    an output driver for producing the output of the microphone bias driver; and
    a slew rate control circuit for receiving a reference input and providing a slew-rate-controlled output signal to an input of the output driver.

8. The audio interface circuit of claim 1, wherein the switching circuit uses a switch protection bias voltage greater than or equal to a power supply voltage of the low voltage domain to protect switches of the switching circuit.

9. The audio interface circuit of claim 1, wherein an audio output driver of the first audio circuit that provides the audio line output signal is designed to tolerate the voltage level of the high voltage domain.

10. The audio interface circuit of claim 1, wherein the switching circuit comprises:
    a P-channel conduction path coupled between the output of the second circuit and the at least one terminal and activated by the control signal; and
    an N-channel conduction path coupled between the output of the second circuit and the at least one terminal and activated by the control signal, whereby a combined action of the P-channel conduction path and the N-channel conduction path prevent a slew-rate of a voltage on the at least one terminal from being increased due to activation of the P-channel conduction path and the N-channel path whereby the switching circuit is designed to track the slew rate of the output of the second circuit.

11. A method of preventing generation of audible artifacts by an audio interface circuit, comprising:
    accepting an audio input signal from or providing an audio line output signal to at least one terminal;
    operating a first audio circuit having an input or an output coupled to the at least one terminal from a low voltage domain;
    receiving the audio input signal as an input to the first audio circuit or providing the audio line output signal as an output from the first audio circuit;
    operating a second circuit from a high voltage domain having a first voltage level greater than a second voltage level of the low voltage domain, wherein the second circuit has a load-independent DC output that is generated in response to a control signal and is slew-rate controlled to control a transition time of the output of the second circuit in response to the control signal; and
    selectively coupling the at least one terminal to an output of the second circuit in response to the control signal with a switching circuit that controls application of a voltage from the output of the second circuit to the at least one terminal,
    so that generation of the audible artifacts by the switching circuit connecting the second circuit to the at least one terminal is avoided.

12. The method of 11, further comprising selecting a function of the at least one terminal between at least one of an audio line input or audio output function for providing an audio line output signal or accepting an audio input signal, and between a microphone bias output function, wherein the first audio circuit is an audio input or line output circuit coupled to the at least one terminal for receiving the audio input signal or supplying the audio line output audio signal, wherein the second circuit is a microphone bias driver having an output that provides the microphone bias output level coupled to the at least one terminal.

13. The method of claim 12, wherein the selecting of the function of the at least one terminal selects between all of the audio line output function, the microphone bias output function, and the audio input function.

14. The method of claim 12, further comprising protecting switches of the switching circuit when the microphone bias driver is not coupled to the at least one terminal by applying a switch protection bias voltage greater than or equal to a power supply voltage of the low voltage domain to the switches.

15. The method of claim 12, wherein the at least one terminal implements terminals of a universal audio jack (UAJ).

16. The method of claim 12, wherein the slew rate of the output of the microphone bias driver is independent of a load presented to the output of the microphone bias driver.

17. The method of claim 16, further comprising
    producing the output of the microphone bias driver from an output of the microphone bias driver; and
    receiving a reference input at a slew rate control circuit of the microphone bias driver; and
    providing a slew-rate-controlled output signal to an input of the output driver from the slew rate control circuit.

18. The method of claim 11, further comprising protecting switches of the switching circuit by applying a switch protection bias voltage greater than or equal to a power supply voltage of the low voltage domain to the switches.

19. The method of claim 11, wherein an audio output driver of the first audio circuit that provides the audio line output signal is designed to tolerate the voltage level of the high voltage domain.

20. The method of claim 11, wherein the switching circuit selectively couples the at least one terminal to an output of the second circuit through a P-channel conduction path activated by the control signal, and an N-channel conduction path activated by the control signal, whereby a combined action of the P-channel conduction path and the N-channel conduction path prevent a slew-rate of a voltage on the at least one terminal from being increased due to activation of the P-channel conduction path and the N-channel path whereby the switching circuit is designed to track the slew rate of the output of the second circuit.

* * * * *